US009330000B2

(12) United States Patent
Chockler et al.

(10) Patent No.: US 9,330,000 B2
(45) Date of Patent: *May 3, 2016

(54) ALLOCATION ENFORCEMENT IN A MULTI-TENANT CACHE MECHANISM

(71) Applicant: International Business Machines Corporation, Armonk, NY (US)

(72) Inventors: Gregory Chockler, Teddington (GB); Guy Laden, Tel Aviv (IL); Benjamin M. Parees, Durham, NC (US); Ymir Vigfusson, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/943,051

(22) Filed: Nov. 17, 2015

(65) Prior Publication Data
US 2016/0070645 A1    Mar. 10, 2016

Related U.S. Application Data

(63) Continuation of application No. 13/476,016, filed on May 21, 2012, now Pat. No. 9,235,443, which is a continuation of application No. 13/306,996, filed on Nov. 30, 2011, now Pat. No. 8,850,122.

(51) Int. Cl.
*G06F 12/00* (2006.01)
*G06F 12/08* (2016.01)
*G06F 3/06* (2006.01)

(52) U.S. Cl.
CPC .......... *G06F 12/0802* (2013.01); *G06F 3/0604* (2013.01); *G06F 3/0631* (2013.01); *G06F 3/0673* (2013.01); *G06F 2212/601* (2013.01); *G06F 2212/604* (2013.01)

(58) Field of Classification Search
USPC ........................................................ 711/133
See application file for complete search history.

(56) References Cited

U.S. PATENT DOCUMENTS

| 6,601,143 | B1 | 7/2003 | Lamparter |
| 6,748,487 | B1 | 6/2004 | Takamoto et al. |
| 7,831,796 | B2 | 11/2010 | Bansal et al. |

(Continued)

OTHER PUBLICATIONS

Ranganathan et al., "Reconfigurable Caches and their Application to Media Processing", In 27th Intl. Symp. on Computer Architecture, Jun. 2000.

(Continued)

*Primary Examiner* — Jared Rutz
*Assistant Examiner* — Hamdy S Ahmed
(74) *Attorney, Agent, or Firm* — David Zwick; Gilad Mintzer-Magal

(57) ABSTRACT

Cache optimization. Cache access rates for tenants sharing the same cache are monitored to determine an expected cache usage. Factors related to cache efficiency or performance dictate occupancy constraints. A request to increase cache space allocated to a first tenant is received. If there is a second cache tenant for which reducing its cache size by the requested amount will not violate the occupancy constraints for the second cache tenant, its cache is decreased by the requested amount and allocated to satisfy the request. Otherwise, the first cache size is increased by allocating the amount of data storage space to the first cache tenant without deallocating the same amount of data storage space allocated to another cache tenant from among the plurality of cache tenants.

12 Claims, 5 Drawing Sheets

(56) References Cited

U.S. PATENT DOCUMENTS

| | | |
|---|---|---|
| 8,850,122 B2 | 9/2014 | Chockler et al. |
| 2007/0088915 A1 | 4/2007 | Archambault et al. |
| 2008/0065718 A1* | 3/2008 | Todd ................. G06F 17/30902 709/203 |
| 2010/0023937 A1 | 1/2010 | Kothari et al. |
| 2010/0082547 A1 | 4/2010 | Mace et al. |
| 2010/0281216 A1 | 11/2010 | Patel et al. |
| 2011/0238919 A1 | 9/2011 | Gibson et al. |
| 2012/0005431 A1 | 1/2012 | Gross et al. |
| 2012/0041914 A1 | 2/2012 | Tirunagari |
| 2012/0136602 A1 | 5/2012 | Hossain et al. |
| 2013/0138891 A1 | 5/2013 | Chockler et al. |

OTHER PUBLICATIONS

Jain et al., "Software-Assisted Cache Replacement Mechanisms for Embedded Systems", In Intl. Conf. on Computer-Aided Design, 2001.

Suh et al., "A New Memory Monitoring Scheme for Memory-Aware Scheduling and Partitioning", In High Performance Computer Architecture, 2002.

Seongbeom et al,. "Fair Cache Sharing and Partitioning in a Chip Multiprocessor Architecture", In Proceedings of the 13th International Conference on Parallel Architectures and Compilation Techniques (PACT '04), 2004.

Moinuddin et al., "Utility-Based Cache Partitioning: A Low-Overhead, High-Performance, Runtime Mechanism to Partition Shared Caches", In Proceedings of the 39th Annual IEEE/ACM International Symposium on Microarchitecture (MICRO 39), 2006.

Chockler et al., "Data Caching as a Cloud Service", Proceedings of the 4th ACM/SIGOPS Workshop on Large-Scale Distributed Systems and Middleware, pp. 18-21, LADIS 2010.

Anonymous, "Methods for Coarse-Grained Cache Utility Profiling in CLOCK Using Valueless Keys," An IP.com Prior Art Database Technical Disclosure, Jul. 14, 2011, IP.com No. 000208668.

Kędzierski et al., "Adapting Cache Partitioning Algorithms to Pseudo-LRU Replacement Policies," IEEE International Symposium on Parallel & Distributed Processing (IPDPS), 2010.

Mattson et al., "Evaluation techniques for storage hierarchies," IBM Systems Journal, 1970, p. 78-117, Issue No. 2.

Pending U.S. Appl. No. 14/935,567, titled "Allocation Enforcement in a Multi-Tenant Cache Mechanism," filed Nov. 9, 2015, pp. 1-41.

* cited by examiner

ALLOCATION ENFORCEMENT IN A MULTI-TENANT CACHE MECHANISM

CROSS-REFERENCE TO RELATED APPLICATIONS

This Application is a continuation of, and claims priority to, application Ser. No. 13/476,016, filed on May 21, 2012, which is a continuation of, and claims priority to, application Ser. No. 13/306,996, filed on Nov. 30, 2011, the contents of each of which are incorporated herein in their entireties.

BACKGROUND

The disclosed subject matter relates generally to optimizing a cache mechanism in a computing environment and, more particularly but not exclusively, to a method or system for profiling and estimating cache efficiency by collecting statistics corresponding to successful cache usage rates.

In computing systems, a cache mechanism may be utilized to improve data access speeds. This is accomplished by way of temporarily copying certain target data stored in a primary data storage area (i.e., auxiliary memory) to a secondary data storage area (i.e., cache memory). Cache memory can be accessed faster than the auxiliary memory, thereby supporting faster data processing speeds.

Due to cost issues, size of cache memory is generally substantially smaller than the auxiliary memory. Therefore, when the cache gets full, a caching algorithm or policy is used to evict older cached data in order to provide room for new data that needs to be copied to the cache. Caching algorithms are utilized to determine a replacement policy that would optimize the use of the caching mechanism with an eye toward increasing the underlying system's performance.

In a cache environment in which multiple tenants (e.g., services, applications, processors or machines) compete for cache space, it is important to implement a cache allocation or cache replacement policy that would allocate the available cache space to the more deserving tenants (e.g., tenants defined as having a higher priority over the others) while maintaining the overall optimization in the cache environment and without substantially or disruptively affecting the individual efficiency of the other tenants or the system as a whole.

BRIEF SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Embodiments of the present invention disclose a method, computer program product, and system for cache optimization. Cache access rates for a plurality of cache tenants sharing the same cache mechanism having an amount of data storage space are monitored, wherein each cache tenant is allocated a cache space having a cache size within the data storage space. Cache profiles for the plurality of cache tenants are determined according to data collected during the monitoring. The cache profiles for the plurality of cache tenants are analyzed to determine an expected cache usage model for the cache mechanism. The cache usage model and factors related to cache efficiency or performance for the plurality of cache tenants are analyzed to dictate one or more occupancy constraints that define data storage space allocations to the plurality of cache tenants. The data storage allocations to the plurality of cache tenants are examined in response to receiving a request to increase a first cache size by an amount so that additional cache space is allocated to a first cache tenant. In response to determining that there is a second cache tenant from among the plurality of cache tenants for which reducing a second cache size allocated to the second cache tenant by the amount will not violate the occupancy constraints for a cache size allocated to the second cache tenant, the second cache size is decreased by deallocating data storage space allocated to the second cache tenant by the amount and increasing the first cache size by allocating the same amount of data storage space to the first cache tenant to satisfy the request. In response to determining that there is not a second cache tenant from among the plurality of cache tenants for which reducing a second cache size allocated to the second cache tenant by the amount will not violate the occupancy constraints for a cache size allocated to the second cache tenant, the first cache size is increased by allocating the amount of data storage space to the first cache tenant without deallocating the same amount of data storage space allocated to another cache tenant from among the plurality of cache tenants.

BRIEF DESCRIPTION OF THE DRAWINGS

Features, elements, and aspects that are referenced by the same numerals in different figures represent the same, equivalent, or similar features, elements, or aspects, in accordance with one or more embodiments.

DETAILED DESCRIPTION

Figure 1:
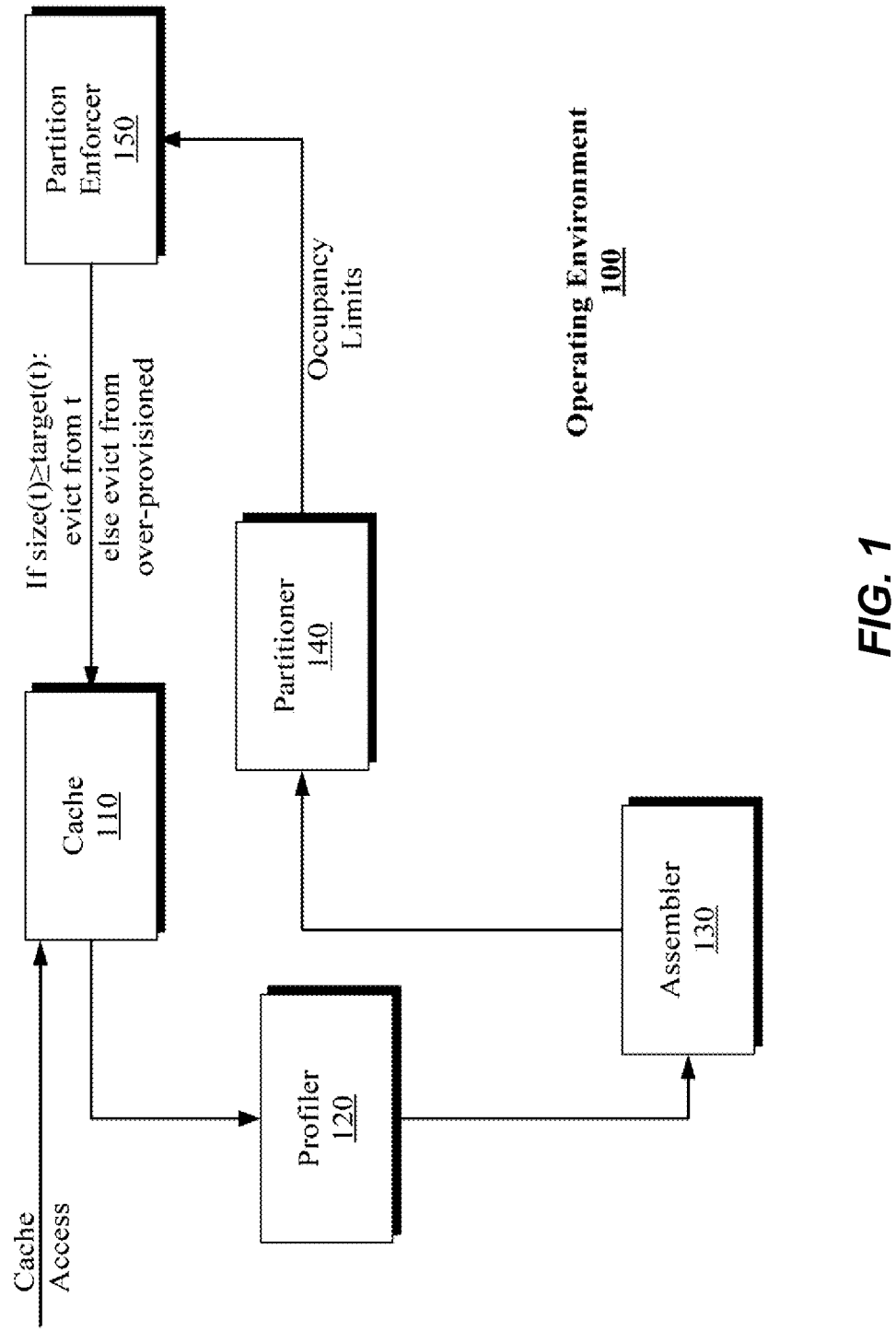
FIG. 1 illustrates an exemplary computing environment in accordance with one or more embodiments, wherein an improved cache mechanism is utilized to enhance caching performance in the computing environment.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one embodiment, caching behavior in a system is monitored and profiled to determine the extent with which the system's performance or quality of service (QoS) would improve or degrade if the cache size was modified. The metric of quality may be based on the cache hit rate and, optionally, based on the assumption that the system's workload will remain relatively constant.

A cache hit refers to successfully servicing a request to access target data in the cache. This is in contrast to a cache miss, where the requested data is not in the cache and instead will have to be copied into the cache from auxiliary memory or another source. If the cache is full, then the requested data replaces another cached item according to a cache replacement policy.

Cache performance, in one embodiment, is evaluated based on an understanding of the cache replacement policy which dictates data eviction or retention, depending on the availability of space in the cache and other factors such as how recently or frequently a cached item is used. In one example, an estimation of the hit rate for various cache sizes is used to build a cache profile that would help predict the change in performance, if the cache size was to be modified, without actually making the modification.

In one embodiment, a cache may be implemented according to a least recently used (LRU) policy. In this implementation, the least recently used data item in the cache is replaced, when a cache miss occurs. The data structure used to implement the cache may be a linked list in which the head of the list is continuously updated to include the most recently hit cached item. As such, the distance between a cached item and the head of the list is an indication of how recently that cached item was subject to a cache hit (i.e., the shorter the distance, the most recent was the hit).

As provided in further detail below, based on the above observation, in one embodiment, the hit rate for a certain cache size x may be estimated by tracking or estimating the distance between the location of a cached item, that is hit, from the head of the list, while taking into account the cache retention or replacement policy. It is noteworthy that in an LRU cache, more than one process may submit a data request to the cache in approximately the same time. Thus, if two cache hits are in close temporal proximity, a contention policy may be used to determine how to update the head of the list.

The combination of the above-noted update procedures for the head of the list, with the contention issues when a cache hit occurs, may result in substantial overhead. Therefore, in one embodiment, a data structure and cache replacement policy is employed that more efficiently manages the cache. In an exemplary embodiment, a data structure hereafter referred to as a "clock" is used to organize the cache. The clock has a functionally circular nature, wherein cached items 1 through N are respectively represented by positions 1 through N in a linear but conceptually circular array such that positions 1 and N are neighbors. Each position logically, but not necessarily structurally, has two neighbors.

To track the hit rate in the clock implementation, an indicator (e.g., a reference bit) is associated with a position in the clock. When a data item is first copied into the cache, the associated reference bit for the corresponding position in the clock is set to off (e.g., 0). When a cached item is hit, the associated reference bit is set to on (e.g., 1). When a cache miss occurs, a replacement is performed by moving a pointer from a current clock position in a first direction (e.g., clockwise direction) until a target clock position with a reference bit set to off is found. The reference bits associated with entries with reference bit set to on are turned off as the pointer moves passed the entries to find the reference bit set to off.

In one or more embodiments, once the entry with the reference bit turned off is found, the cache content in that entry is selected for eviction, and is replaced with the requested data. As such, in the above implementation, cache items with a corresponding reference bit set to off are deemed to be the least recently used; and cache items with a reference bit set to on are deemed to be the most recently used and depending on implementation may also reflect the most frequently used cached items.

In one embodiment, the above scheme is configured to estimate the hit rate for a clock implemented cache for one or more target cache sizes by profiling the current caching activity and using an existing instance of the cache replacement policy, without having to emulate multiple instances of the cache replacement for caches of different sizes. The profiling data is used to estimate the cache hit rates for said one or more target cache sizes based on statistics gathered about the current cache hits and misses and the respective overtime decay as adapt to changing workloads. In other words, the number of hits for cache items at known (or approximated) distances from the head of the list is collected. Based on said statistics, the potential number of cache hits for a cache of different sizes is extrapolated.

As provided in further detail below, in one example, a function based on the cache size and a designated parameter is used to collect the statistics for estimating the hit rate for a cache of size x. Depending on implementation, the value of the designated parameter (hereafter "k") may be calculated based on the number of cache items which are deemed as least recently used. For example, the value of k may be calculated by subtracting the number of items x in the cache from value A which represents the number of active items in the cache (i.e., k=x−A). The active cache items are entries that are associated with a reference bit that is set to on, for example, indicating the corresponding cache item was recently hit.

In one embodiment, it is approximated how well the cache will perform in terms of hit rate if the cache size is reduced. If there are k active entries in the cache with the reference bit set to on, for example, then it may be extrapolated that the cache entry would have had a hit if there were k or more entries stored in cache 110. In other words, the relative recency (i.e., as related to hit ratio) of entries in a clock implemented cache may be estimated by looking at the total number of active entries.

As such, in one embodiment, a cache hit i in a clock implemented cache, where $k_i$ entries have been recently used, implies that a cache hit would also happen if the cache was of size at least $k_i$. It can be estimated that the expected number of hits to a cache of size s will be the sum of $1/k_i$ for one or more hits i where $k_i$ does not exceed s. In an example embodiment, it is assumed that a hit would happen uniformly at random in the first $k_i$ entries. In alternate embodiments, other distributions may be supported. To perform estimates beyond the current size of the cache, the method of least squares or suitable alternatives may be utilized, for example.

The method of least squares refers to an approach to approximate the solution to a linear system with more equations than unknowns, such as the cache mechanism provided above. The term "least squares" means that the overall solution minimizes the sum of the squares of the errors made in solving every single equation in the linear system. One or more exemplary embodiments implementing the above disclosed schemes are provided below with some detail to further clarify one or more aspects of the disclosed subject matter.

Referring to FIG. 1, an exemplary operating environment 100 is illustrated that, as shown, includes a cache 110 with a clock replacement policy, a profiler 120, an assembler 130, a partitioner 140 and a partition enforcer 150. Profiler 120 is a mechanism that, optionally on a continuous basis, gathers statistics about the hit rate and occupancy of a clock implemented cache during regular operations. In the following, it is assumed that the data associated with a cache entry is of fixed size as used in, for example, page replacement systems for virtual memory, virtual machine memory over-commit, paged database storage, etc.

It is noteworthy, however, that in embodiments where the objects are of variable sizes (e.g., web caching, application level caching in web apps, etc.), a straightforward generalization of the following approach may be used to associate an object with the number of pages, and treat a hit as a hit to each of those pages. In other words, the embodiments that support variable cache size entries may be implemented to execute multiple instances of the mechanisms provided in further detail below simultaneously on each hit.

In the following, when discussing a cache hit, it is assumed that time moves in implicit epochs. An epoc refers to a segment in time for which the cache related statistics collected by the profiler 110 are analyzed by the assembler 130. In certain embodiments, real-time size epochs (e.g., 5 minutes) may be used. After each epoch, the statistics that have been gathered are decayed by, for example, a background thread executed by the assembler 130. This ensures that changes to the popularity distributions are detected. To improve synchronization, the collected hit statistics may be partitioned into fixed sized epochs whose length may be expressed in either number of hits, or in real time.

The assembler 130 may decay statistics that have been gathered within that epoch using exponential average, for example, by the background thread as described in further detail below. This ensures that changes to the popularity distributions are detected. Within each epoch, the hit statistics are recorded and stored by the profiler 120. Thus, assembler 130 is utilized to process the statistics gathered by profiler 120 and to convert the statistics to a useful representation for partitioner 140 which consumes the mapping of cache sizes to the hit rate estimates for a cache tenant produced by the profiler 120 and assembler 130.

Partitioner 140, in one embodiment, outputs the allocation boundaries for a tenant. An exemplary partitioner 140 may take into account the desired quality of service guarantees, such as maximizing the total hit rate. Cache partitioning benefits from the profiling technique disclosed here. The profiling technique may be also used in cost-benefit analysis associated with allocating more or less space in a cloud-based caching service (e.g., Amazon Elastic Cache).

Thus, in one embodiment, profiler 120 is utilized to collect runtime cache usage statistics. Profiler 120 is invoked on a cache hit, and on an iteration of the clock traversal loop executed as a part of the cache miss handling. The profiler 120, according to one implementation, generates cache usage statistics collected in the course of the profiling epochs in the form of a mapping based on an LRU model stack distance to the estimated number of hits received by the items stored at those distances.

Assembler 130 receives the cache usage statistics produced by profiler 120 and outputs the cache usage model in the form of number of hits as a function of the cache size, for example. Depending on whether the space in the cache is shared among multiple tenants and given the per-tenant quality of service (QoS) requirements or other administrative, functional or performance related goals, partitioner 140 produces a set of cache allocation constraints for a tenant in the form of, for example, a system of linear inequalities that satisfies the desired goals.

In one embodiment, partition enforcer 150 receives the allocation constraints (e.g., occupancy limits) designated by partitioner 140 and defines a cache replacement policy for a respective tenant that will ensure that the tenant space allocation will eventually (e.g., gradually over the course of time) satisfy the desired constraints. As noted, optionally, the constraints may be expressed in the form of a system of linear inequalities that are either produced by partitioner 140 or dictated by way of external administrative inputs as provided in further detail below.

Advantageously, using the above methods, flexibility may be introduced in the constraints specification gradually as opposed to an immediate change. For example, in addition to simple per-tenant maximum/minimum occupancies, the proposed framework is also capable of accommodating linear combinations of per-tenant constraints, such as cumulative occupancy limits of the subset of tenants, and/or weighted limits. Further, the methods may support dynamic changes in the constraints without relying on static reservation in one or more embodiments.

Given a collection of tenants along with their occupancy constraints (which may change dynamically at runtime), partition enforcer 150 dictates a cache replacement or cache eviction policy such that the tenant occupancies eventually satisfy the expressed constraints, desirably without reserving the cache space in advance. Optionally, the target occupancy constraints may be defined as a system of linear inequalities of the form $Ax^T \leq b$, where A is a matrix of integer coefficients, $x^T$ is an integer valued column vector of variables corresponding to the tenant occupancies, and b is a vector of constants, and x is the current cache size allocated to a tenant.

The constraints may be dynamic and may thus change at runtime allowing a human operator (or an automated control system) to exercise control over the amount of space being requested. By way of example, two methods for enforcing the occupancy constraints may be utilized. Method 1 stipulates the existence of per-tenant replacement policies, without restrictions on how those policies are implemented as long as the policies support a corresponding application programming interface (API) for adding and evicting a cache entry, where various cache policies (e.g., LRU, LFU, or CLOCK) may be used as the per-tenant replacement policy implementations. Method 2 integrates the occupancy enforcement mechanism directly into the CLOCK replacement policy.

Both methods gain efficiency by not requiring to derive an explicit solution for the system of constraints. Instead, the implementation maintains L1 (i.e., non-normalized) distances between the current allocation and the hyperplanes that correspond to the individual constraints. In the context of this disclosure, a hyperplane of an n-dimensional space is a flat subset with dimension n−1, which separates the n-dimensional space into two half-spaces. In one embodiment, an affine hyperplane may be used. An affine hyperplane is an affine subspace of co-dimension 1 in an affine space. In Cartesian coordinates, such a hyperplane can be described with a single linear equation of the following form (where at least one of the ai's is non-zero): $a1x1+a2x2+ \ldots +anxn=b$.

In one exemplary embodiment, when a new object O owned by a tenant T is to be added to the cache, in case of a cache miss, the implementation evaluates the benefits of various modifications of the current allocation to accommodate cache allocation for the object O. The benefits are evaluated by comparing the distances between the prospective and current allocation vectors and the constraints. The prospective allocation is accepted, if the new distances are not higher than the current one; otherwise, the prospective allocation is rejected and the current allocation is maintained.

In one embodiment, a prospective allocation resulting from adding an object O (owned by a tenant T) to a current tenant T's allocation without evicting other objects is evaluated first. If the prospective allocation plan is rejected, the allocation resulting from replacing another object O' (owned by tenant T') with object O is evaluated. Two approaches may be applied to find object O' to be replaced with O.

For example, Method 1 will examine the multiple tenants until a tenant is found where the occupancy of the tenant owning an object to be evicted can be reduced without causing the resulting allocation to move farther away from any of the respective constraints. If so, the replacement policy of that tenant is updated to evict a corresponding object from the cache, and replace it with O. In contrast, Method 2 will examine cache entries organized into a circular array until finding an entry E such that the recently used bit associated with E is unset, and the occupancy of the tenant owning E can be reduced without causing the resulting allocation to move farther away from any of the constraints.

It is noteworthy that the above two proposed methods are implemented so as to not force an explicit solution for the system of constraints, which is known to take exponential time. The complexity of both methods is O(N*C) where N is the number of tenants and C is the number of constraints. In practice, since the number of constraints involving a tenant is typically small, the complexity is close to O(N). Furthermore, the methods converge to a correct allocation starting from an arbitrary initial allocation provided the tenants invoke cache requests.

In one embodiment, the proposed methods may be used to support both on-demand caching systems (e.g., caches used in databases and web environments) and key-value RAM-based stores (e.g., memcached or Google Memcache service). In addition, the CLOCK-based implementation is simple, memory efficient, and allows for high-degree of parallelism in accessing the cache for both hits and misses. Without limitation, exemplary implementations of pseudocodes for both of the proposed methods is provided below.

For the occupancy enforcement mechanism, let us consider a multi-tenant cache management system in which the storage space is shared among N tenants identified by the integers 1, 2, . . . , N. The cache is modeled as a key-value store mapping the set K of keys to the set V of values. Each key is associated with a unique tenant, which for a given key k∈K, can be accessed through k.tenant. For simplicity, here, we assume that values are of the same size.

The amount of storage allocated to the objects owned by a tenant is managed by partition enforcer 150, hereafter also referred to as occupancy enforcement (OE) mechanism. The target tenant occupancies are specified as a system of linear constraints S of the form $a \cdot c^T \leq b$, where a is a 1×N vector of integer coefficients, b is an integer constant term, and $c^T$ is a N×1 column vector of variables representing the tenant occupancies. We assume that S either is compatible with, or explicitly includes the constraints of the form $c_i \geq 0$ for $1 \leq i \leq N$; and that S has at least one integer solution. The set of constraints is not fixed, and may be updated dynamically at runtime.

Given a constraint $s = a \cdot c^T \leq b$, and a point x in N-dimensional space, a signed distance between x and s, sdist(x, s), is defined to be $a \cdot x^T - b$. The (absolute) distance between x and s, dist(x, s), is defined to be sdist(x, s) if sdist(x, s)>0, and 0 otherwise. In other words, dist(x, s) is the distance between x and a hyperplane defined by $a \cdot c^T - b$ if x does not satisfy s, and 0 otherwise.

In one embodiment, OE is implemented to ensure that the amount of space allocated to a tenant stays as close to satisfying the constraints in S as possible. OE is invoked in one of the following three cases: (1) a new key-value mapping is to be added to the cache, (2) the set of constraints in S is updated, and (3) a mapping currently in the cache has been requested according to the following three corresponding primitives:

add(k, v): add a new mapping (k,v) to the cache, possibly replacing an existing mapping (k',v').

access(k): notify the OE of a new request to the key k.

evict( ): remove a surplus mapping from the cache if exists.

OE maintains the following states:

allocVector: an integer array of size N where for a tenant i, allocVector[i] holds the number of objects currently allocated to i.

S: the current set of allocation constraints.

signedDist: a mapping from S to the set of integers where for a constraint s∈S, signedDist[s]=sdist(allocVector$^T$, s).

An absolute distance is derived from a signed distance using the following routine:

int getDistance(int signedDist) {
    return d≤0 ? 0: signedDist;
}

We define the following predicates over the states of OE:

underprovisioned(i)=∃s=(a~$c^T$≤b)∈S: getDistance(signedDist[s]+$a_i$)<getDistance(signedDist[s]);

overprovisioned(i)=∃s=(a·$c^T$≤b)∈S: getDistance(signedDist[s]−$a_i$)<getDistance(signedDist[s]);

canGrow(i)=∀s=(a·$c^T$≤b)∈S such that $a_i \neq 0$: getDistance(signedDist[s]+$a_i$)≤getDistance(signedDist[s]);

canShrink(i)=∀s=(a·$c^T$≤b)∈S such that $a_i \neq 0$: getDistance(signedDist[s]−$a_i$)≤getDistance(signedDist[s]);

mustShrink(i)=canShrink(i)^∃s=(a·$c^T$≤b)∈S such that $a_i \neq 0$: getDistance(signedDist[s]−$a_i$)≤getDistance(signedDist[s]);

canTransfer(i, j)=∀s=(a·$c^T$≤b)∈S such that $a_i \neq 0$: getDistance(signedDist[s]−$a_i$+$a_j$)≤getDistance(signedDist[s]);

In one embodiment, OE is to satisfy either one of the following two properties: strong convergence and weak convergence as defined below.

Strong Convergence: Suppose that from time t onwards, the set of constraints S does not change, there are many invocations of evict, and for a tenant i, there are many add(k, *) such that k.tenant=i. Then, there exists time t'≥t such that for times t"≥t', allocVector at t" satisfies the constraints.

Weak Convergence: Suppose that from time t onwards, the set of constraints S does not change, there are many invocations of evict, and for a tenant i, there are many add(k,*) such that k.tenant=i. Then, there exists time t' such that starting from t' onwards, for tenants i: underprovisioned(i) is false (i.e., the vector of occupancies at t' either satisfies the constraints or may be brought closer to satisfying the constraints by reducing the occupancies of some tenants).

The OE mechanism above may be used as a part of both demand caching systems (such as those implemented by a Virtual Memory subsytem of an OS, or data base caches), and key-value (e.g., NoSQL) RAM-based stores (such as, memcached, Google's memcache service, Schooner, Gear6, etc.) employed by web-based services (such as, Facebook, LiveJournal, Wikipedia, etc.).

To support the former, the value corresponding to the key that caused a cache miss will first be retrieved from the backing store, and then added to the cache by calling the add primitive. To support the latter, the add primitive will be used directly to store the key-value pair in the cache. In either case, evict can be called upon an update to the set of constraints to clean up surplus objects from the cache, or used as a part of a background clean-up task for lazy removal.

Figure 2:
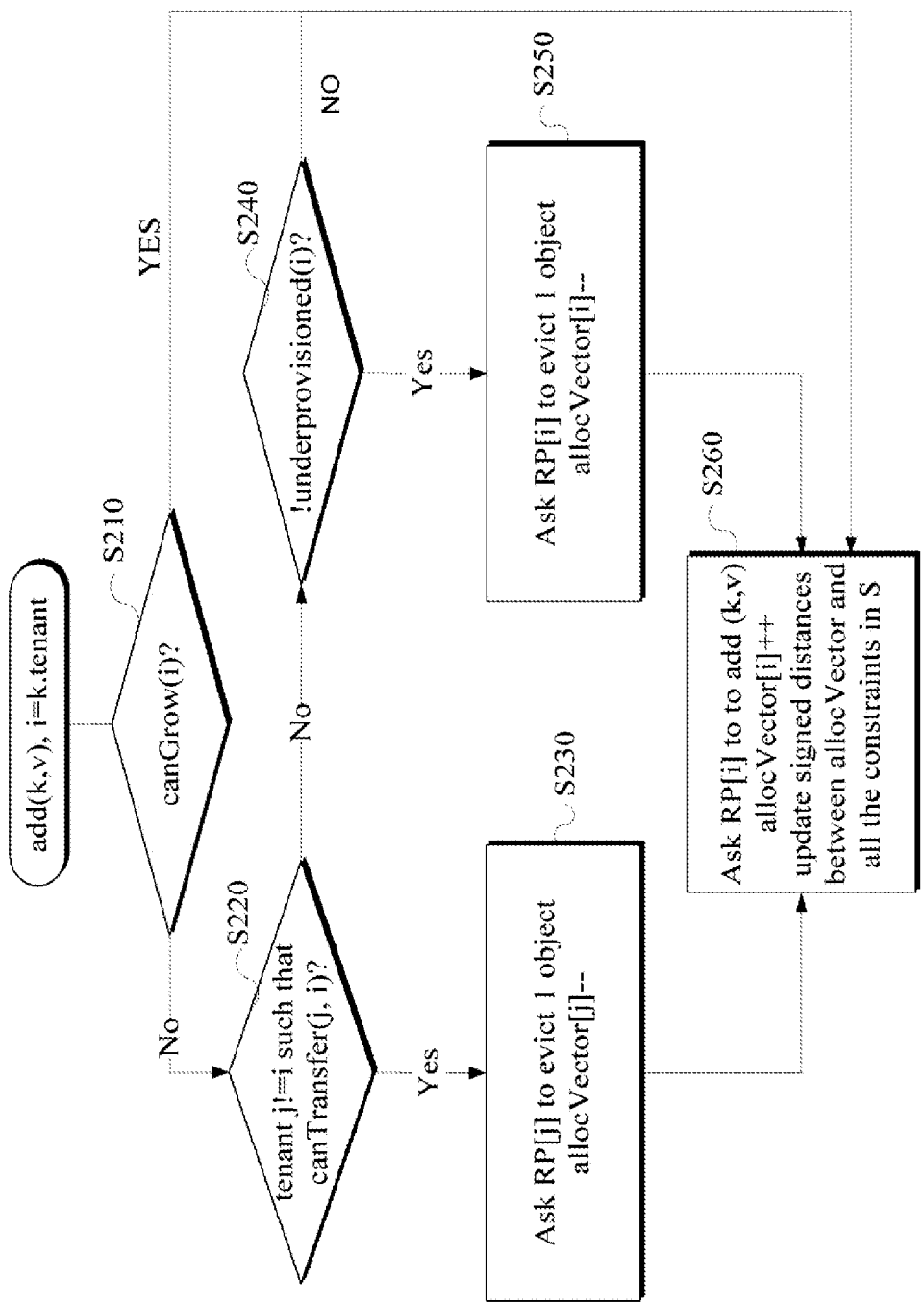
FIG. 2 is a flow diagram of an example method for allocating cache space to one or more tenants in a multitenant cache environment based on statistical profiling of cache usage by the tenants and the associated performance constraints, in accordance with one embodiment.

Referring to FIG. 2, the implementation below assumes that the objects owned by a tenant i are managed by a separate replacement policy RPi. The per-tenant replacement policies are not restricted in any way, and may employ any replacement algorithm, such as LRU, LFU, Clock, for example.

State Transitions:
add(k, v):
Let i=k.tenant;
(S210) If !canGrow(i) then
(S220) If ∃ j≠i such that canTransfer(j,i) then
(S230) Ask RP[j] to evict one object;
    allocVector[j]--;
(S240) Else if !underprovisioned(i);
(S250) Ask RP[i] to evict one object;
    allocVector[i]--;
(S260) Ask RP[i] to add (k, v);
    allocVector[i]++;
    updateSignedDistances( );
EVICT( ):
For each tenant i do:
  If mustShrink(i)>0 then
    Ask RP[i] to evict one object;
    allocVector[i]--;
    updateSignedDistances( );
    return;
ACCESS(K):
Notify RP[k.tenant] of access to k;
S IS UPDATED:
updateSignedDistances( );

Note that the add code above provides that for a given total cache occupancy C, it is possible to converge to an allocation satisfying all the constraints without exceeding the prescribed allocation of any tenant, provided the hyperplane $c1+ \ldots +cN=C$ intersects the solution polytope (see S220-S230 in FIG. 2). This implies that if the bound on the total occupancy is known, or can be easily derived from the set of constraints (as it is often the case in practice), then convergence will be guaranteed if evict is invoked sufficiently many times for the total occupancy to reach that bound, and only adds are invoked afterwards. This will result in a more efficient on-demand implementation where the tenant occupancies will adjust in response to the add invocations removing the need for the entries to be eagerly evicted. The above OE implementation based on per-tenant replacement policies satisfies Strong Convergence.

Proof: Let t1 be an arbitrary time. We first show that there exists time t2≥t1 such that starting from t2 onwards, no tenant is underprovisioned (i.e., for tenants i, undeprovisioned(i) is false) provided add and evict are invoked infinitely often for all tenants.

Let i be a tenant such that underpovisioned(i) is true at t1. On an invocation of add(k,*) with k.tenant=i that occurs after t1, and as long as underprovisioned(i)=false, one object will be added to i (S260), and no object will be removed from i (S240-250). Moreover, by definitions of the mustShrink and underpovisioned predicates and as long as underprovisioned (i)=false, no evict invoked after t1 will reduce the occupancy of i. Since add(k, *) with k.tenant=i is invoked infinitely often after t1, there exists time e>t1 such that undeprovisioned(i)=false at t'. If no tenant i such that underprovisioned(i)=true at t1 exists, we set e=t1.

It is noteworthy that after t', i's occupancy may be reduced by evict. If that happens, then by the evict code, for a constraint s∈S, the occupancy vector resulting from evicting an i's object either satisfies s, or gets closer to satisfying s. Hence, undeprpovisioned(i)=false after the evict. The time t2 being asked by the claim is obtained by setting it to be the maximum of times t' of all tenants.

There exists time t3≥t2 such that starting from t3 onwards, no tenant is overprovisioned. Inducting on the ordering of tenants in the loop of evict( ) assume that for tenants j<i overprovisioned(j)=false, and consider tenant i. If i is not overprovisioned, then induct on the next tenant. Otherwise, note that since both canGrow(i) and underpovisioned(i) are false, no call to add(k,*), k.tenant=i, will increase i's occupancy after t2 (S220-S230). Since mustShrink(i) is true, i's occupancy will be decreased on subsequent calls to evict. Since by assumption, infinitely many evicts are invoked, there exists time t'≥t2 such that overprovisioned(i) becomes false at t'. Continuing in this fashion, let t''≥t' be the time at which the induction terminates. The time t3 being asked by the claim is obtained by setting t3=t''.QED.

In one embodiment that implements Method 2 discussed above, the OE mechanism implementation may be integrated into a CLOCK replacement policy. In an example CLOCK replacement, the entries in the cache are organized into a circular array. An entry is associated with a recently used bit which is set to true each time the entry is accessed. Whenever an entry which is not presently in the cache is requested (i.e., a cache miss occurs), the array is traversed until an entry with an unset recently used bit is found. This entry is then replaced with a new entry.

The CLOCK replacement policy has the following two key advantages: (1) a high degree of parallelism in handling concurrent cache requests, (2) low overhead of handling hits. In particular, handling of multiple concurrent hits as well concurrent hits and misses can proceed in parallel. In addition, when handling a miss, synchronization is only needed for incrementing the clock hand. As a result, multiple concurrent misses will be handled in parallel, and help each other to terminate faster.

On the other hand, the possibility of concurrent hits while handling a miss might result in scenarios where no entry with recently used bit turned off can be found. To prevent the hand from indefinitely circling around the clock, the maximum number of entries that may be inspected on a miss is bounded by a configured constant (which is expressed as a fraction of the number of entries currently in the clock, for example). As a result, the OE mechanism might not be able to find an optimal replacement, resulting in the possibility of the occupancies of some tenants growing beyond the limits (i.e., overprovisioning). Although such scenarios are rare in practice, formally, the CLOCK based OE can only guarantee the Weak Convergence property.

Figure 3:
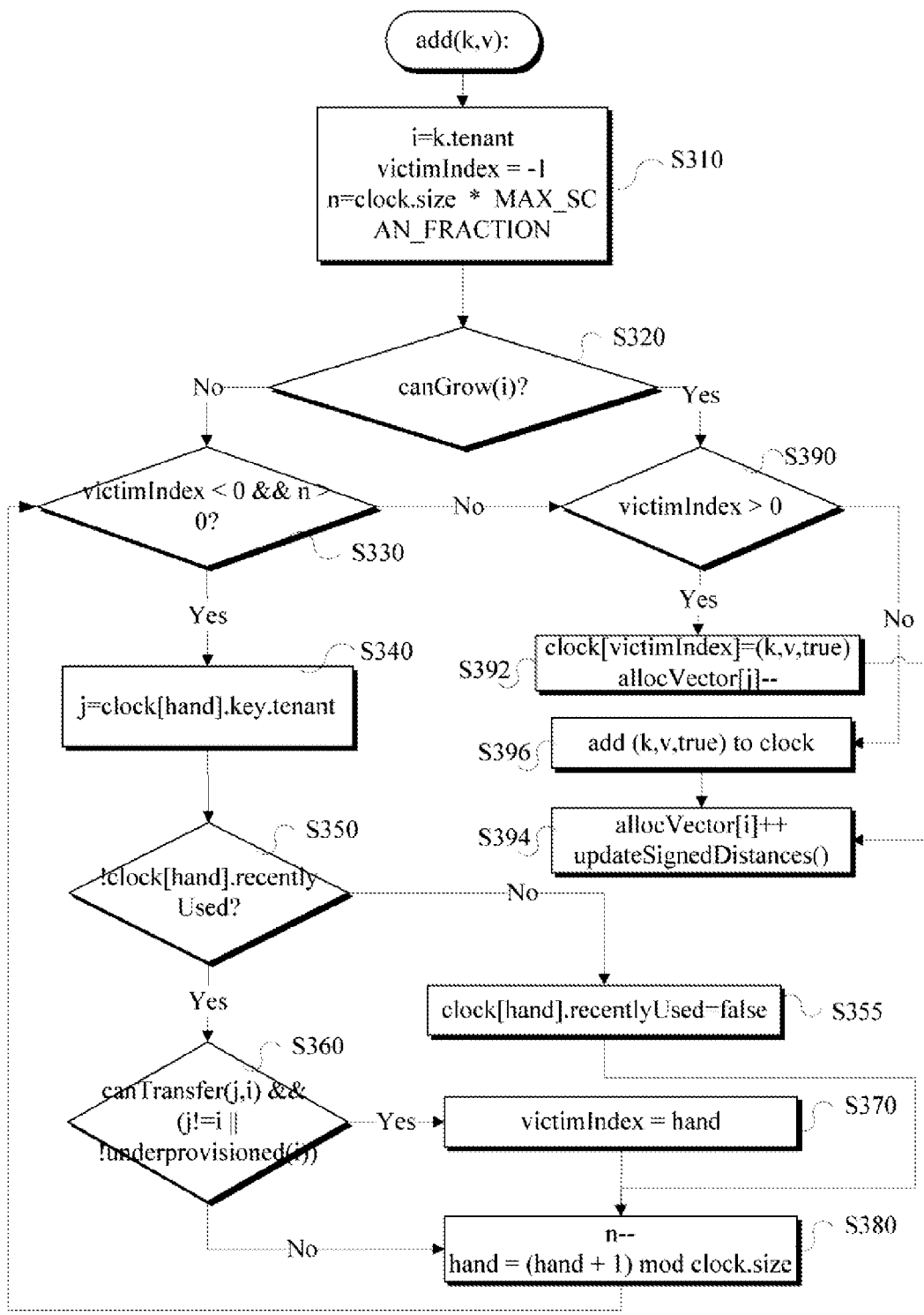
FIG. 3 is a flow diagram of an example method for allocating cache space to one or more tenants in a multitenant cache environment based on statistical profiling of cache usage by the tenants and the associated performance constraints, in accordance with another embodiment.

Referring to FIG. 3, an exemplary implementation of Method 2 for updating the replacement policy for a plurality of tenants in a cache taking into account a set of respective constraints for said tenants is provided as follows:

Types:
ClockEntry=K×V×{true,false} with selectors key, val, recentlyUsed.
States:
clock: a circular array of ClockEntry, initially empty.
hand: the integer index in clock, initially 0.
State Transitions:
add(k, v):
(S310) Let i=k.tenant, victimIndex=-1,
    n=clock.size*MAX_SCAN_FRACTION;
(S320) If !canGrow(i) then
  (S330) while (victimIndex<0 && n>0) do:
    (S340) j=clock[hand].key.tenant;
    (S350) If !clock[hand].recentlyUsed then
      (S360) If canTransfer(j,i) &&
        [j≠i||!underprovisioned(i)]
      (S370) victimIndex=hand;

```
        Else
            (S355) clock[hand].recentlyUsed=false
        (S380) n--;
            hand=hand+1 mod clock.size;
    (S390) If victimIndex>0 then
        (S392) clock[victimIndex]=(k, v, true);
            allocVector[j]--;
    Else
        (S394) add (k, v, true) to clock;
            allocVector[i]++;
    (S396) updateSignedDistances( );
evict( ):
victimIndex=-1,
    n=clock.size*MAX_SCAN_FRACTION;
while (victimIndex<0 && n>0) do:
    i=clock[hand].key.tenant;
    If !clock[hand].recentlyUsed then
        If mustShrink(i) then
            victimIndex=hand;
        Else
            clock[hand].recentlyUsed=false;
        n--;
        hand=hand+1 mod clock.size;
    If victimIndex>0 then
        Remove clock[victimIndex];
        allocVector[i]--;
        updateSignedDistances( );
access(k):
Find entry e in clock such that e.key=k;
e.recentlyUsed=true;
S is updated:
updateSignedDistances( );
```

The OE implementation based on a single CLOCK eviction policy satisfies Weak Convergence. The proof is similar to that used above to show that eventually no tenant is under-provisioned in the proof of Strong Convergence for the implementation based on per-tenant replacement policies.

Accordingly, two methods for ensuring tenant occupancy in a multi-tenant cache system are provided. The first method is modular allowing any existing replacement policy to be plugged in as a black box. The second method is highly efficient due to its use of the Clock replacement. Advantageously, the methods do not require eager reallocation and help converge to the desired cache boundaries in a gradual fashion. Both methods allow the occupancy constraints to be expressed as a system of linear inequalities, addressing a wide range of usage patterns. The constraints themselves may be modified dynamically at runtime without stopping the system, or having the system go through any computationally intensive reset activities.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
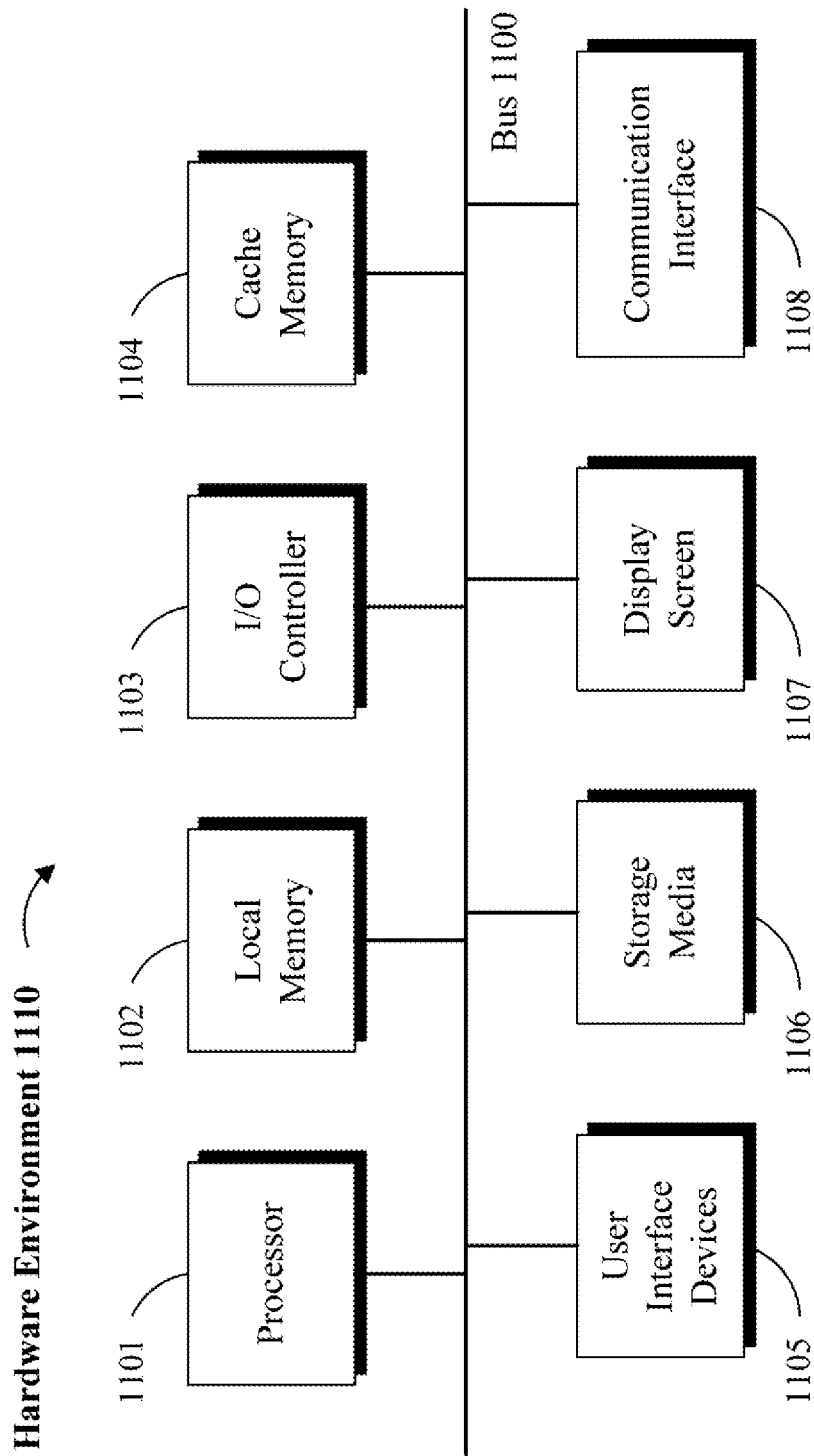
FIGS. 4A and 4B are block diagrams of hardware and software environments in which the disclosed systems and methods may operate, in accordance with one or more embodiments.
Figure 4B:
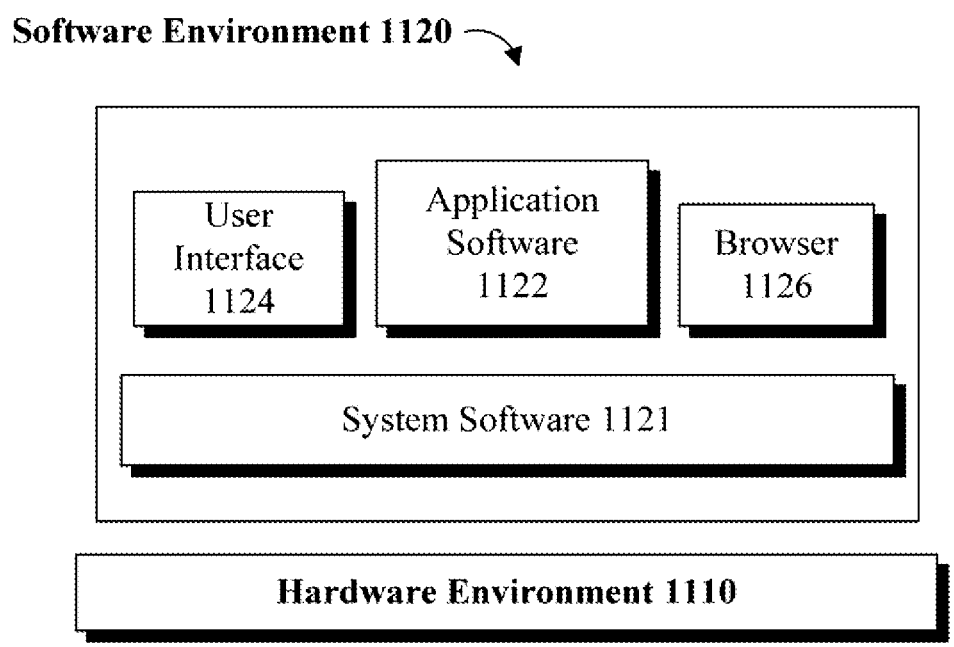

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer system for cache optimization, the computer system comprising:
   one or more computer processors, one or more computer-readable storage media, and program instructions stored on one or more of the computer-readable storage media for execution by at least one of the one or more processors, the program instructions comprising:
   program instructions to monitor cache access rates for a plurality of cache tenants sharing the same cache mechanism having an amount of data storage space, wherein each cache tenant is allocated a cache space having a cache size within the data storage space;
   program instructions to determine cache profiles for the plurality of cache tenants according to data collected during the monitoring;
   program instructions to analyze the cache profiles for the plurality of cache tenants to determine an expected cache usage model for the cache mechanism;
   program instructions to analyze the cache usage model and factors related to cache efficiency or performance for the plurality of cache tenants to dictate one or more occupancy constraints that define data storage space allocations to the plurality of cache tenants;
   program instructions to examine the data storage allocations to the plurality of cache tenants, in response to receiving a request to increase a first cache size by an amount so that additional cache space is allocated to a first cache tenant;
   program instructions, in response to determining that there is a second cache tenant from among the plurality of cache tenants for which reducing a second cache size allocated to the second cache tenant by the amount will not violate the occupancy constraints for a cache size allocated to the second cache tenant, to decrease the second cache size by deallocating data storage space allocated to the second cache tenant by the amount and increasing the first cache size by allocating the same amount of data storage space to the first cache tenant to satisfy the request; and
   program instructions, in response to determining that there is not a second cache tenant from among the plurality of cache tenants for which reducing a second cache size allocated to the second cache tenant by the amount will not violate the occupancy constraints for a cache size allocated to the second cache tenant, to increase the first cache size by allocating the amount of data storage space to the first cache tenant without deallocating the same amount of data storage space allocated to another cache tenant from among the plurality of cache tenants.

2. The computer system of claim 1, wherein the program instructions to determine that there is a second cache tenant from among the plurality of cache tenants for which reducing a second cache size allocated to the second cache tenant by the amount will not violate the occupancy constraints for a cache size allocated to the second cache tenant use a cache eviction policy shared by all tenants.

3. The computer system of claim 2 wherein the cache eviction policy is based on evicting the least recently used cached item from the cache.

4. The computer system of claim 3 wherein the cache eviction policy is implemented using a clock cache eviction mechanism.

5. The computer system of claim 4 wherein the clock cache eviction mechanism operates based on a data structure that supports cache entries organized into a circular array, wherein an entry in the circular array is evicted if a recently used bit associated with the entry is unset, and the entry is associated with a cache tenant for which reducing the cache space allocation to said cache tenant will not cause the resulting reduced cache allocation to move farther away from the occupancy constraints for said cache tenant.

6. The computer system of claim 1, wherein current distribution of the cache space among the plurality of cache tenants is represented as an allocation vector in n-dimensional space, wherein n represents a number of the plurality of tenants, and the occupancy constraints are represented by a set of linear inequalities of n variables.

7. The computer system of claim 6 wherein an occupancy constraint is represented as a hyperplane.

8. The computer system of claim 7 wherein intersection of the occupancy constraints in the n-dimensional space is represented as a solution polytope.

9. The computer system of claim 8 wherein the solution polytope refers to a set of points that satisfy a target cache space allocation for a cache tenant based on the occupancy constraints associated with said cache tenant.

10. The computer system of claim 9, further comprising program instructions such that, in response to receiving a request to modify cache allocation for a cache tenant, an allocation vector resulting from the requested modification is not farther away from the solution polytope than the current cache allocation for the cache tenant.

11. The computer system of claim 10, further comprising program instructions for monitoring the distance between a current allocation vector associated with the current cache allocation for the cache tenant and each hyperplane corresponding to the occupancy constraints for the cache tenant, and to update the distance every time cache allocation of any of the tenants changes.

12. The computer system of claim 10 further comprising program instructions for monitoring the distance between a current allocation vector associated with the current cache allocation for the cache tenant and each hyperplane corresponding to the occupancy constraints for the cache tenant, and said distance is updated every time a set of occupancy constraints associated with a cache tenant is updated.

* * * * *